United States Patent [19]

Woodson et al.

[11] Patent Number: 6,020,443
[45] Date of Patent: *Feb. 1, 2000

[54] POLYMERIZATION OF LOW GRADE DCPD MONOMERS USING AN OLEFIN METATHESIS CATALYST

[75] Inventors: Charles S. Woodson, Monroe, La.; Robert H. Grubbs, South Pasadena, Calif.

[73] Assignee: Advanced Polymer Technologies, Inc., Huntsville, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/796,865

[22] Filed: Feb. 6, 1997

Related U.S. Application Data

[63] Continuation-in-part of application No. 08/759,018, Dec. 2, 1996, Pat. No. 5,939,504
[60] Provisional application No. 60/011,284, Feb. 8, 1996, and provisional application No. 60/037,373, Feb. 4, 1997.

[51] Int. Cl.[7] ........................................................ C08F 4/06
[52] U.S. Cl. .......................... 526/135; 526/171; 526/172; 526/283
[58] Field of Search ..................... 526/171, 135, 526/145, 146, 147, 283

[56] References Cited

U.S. PATENT DOCUMENTS

| | | | |
|---|---|---|---|
| 4,380,617 | 4/1983 | Minchak et al. | 526/161 |
| 4,400,340 | 8/1983 | Klosiewicz | 264/328.6 |
| 4,418,179 | 11/1983 | DeWitt et al. | 525/249 |
| 4,426,502 | 1/1984 | Minchak | 526/172 |
| 4,507,453 | 3/1985 | Tom | 526/283 |
| 4,520,181 | 5/1985 | Klosiewicz | 525/247 |
| 4,584,425 | 4/1986 | Tom | 585/827 |
| 4,661,575 | 4/1987 | Tom | 526/283 |
| 4,701,510 | 10/1987 | Minchak et al. | 526/283 |
| 4,703,098 | 10/1987 | Matlack | 526/283 |
| 4,748,216 | 5/1988 | Tom | 526/77 |
| 4,899,005 | 2/1990 | Lane et al. | 585/360 |
| 4,906,797 | 3/1990 | Lane, Jr. et al. | 585/1 |
| 4,943,621 | 7/1990 | Janda et al. | 526/127 |
| 5,312,940 | 5/1994 | Grubbs et al. | 526/136 |
| 5,331,057 | 7/1994 | Brekner et al. | 525/289 |
| 5,342,909 | 8/1994 | Grubbs et al. | 526/171 |
| 5,849,851 | 12/1998 | Grubbs et al. | 526/93 |

FOREIGN PATENT DOCUMENTS

WO 96/20235 7/1996 WIPO.
WO 96/04289 2/1997 WIPO.

OTHER PUBLICATIONS

Schwab, Peter, et al., "Synthesis and Applications of RuCl$_2$(=CHR') (PR$_3$)$_2$: The Influence of the Alkylidene Moiety on Metathesis Activity", *J. Am. Chem. Soc.* 118:100–10 (1996).

Burrell, Anthony, et al., "Synthesis and Reactions of Ru(=CH$_2$)Cl(NO)PPh$_3$)$_2$, a Stable Terminal Methylene complex and the Crystal Structure of Ru(CH$_2$PPh$_3$)($\eta^2$–C$_2$F$_4$)Cl(NO) PPH$_3$)", *J. Chem. Soc. Dalton Trans.*, pp. 609–614 (1991).

Bruce, et al., "Cyclopentadienyl–Ruthenium and –osmium Chemistry. Some Reactions of Substituted Vinylidene Complexes", *J. Organometallic Chem.* 171:C5–C8 (1979).

Nguyen, et al., "Ring–Opening Metathesis Polymerization (ROMP) of Norbornene by a Group VIII Carbene Complex in Protic Media", *J. Am. Chem. Soc. 114*: 3974–3975 (1992).

Grubbs, et al., "Ring–Opening Metathesis Polymerization Catalysts" Polymer Preprints, 35(1), p. 688 (1994).

*Primary Examiner*—David W. Wu
*Assistant Examiner*—Roberto Rabago
*Attorney, Agent, or Firm*—Pillsbury Madison & Sutro LLP

[57] ABSTRACT

Methods for synthesizing polyDCPD via ROMP of low grade DCPD starting materials using Ruthenium or Osmium carbene complex catalyst. Transparent or translucent polyDCPD materials. The Ruthenium or Osmium carbene complex catalysts having the formula

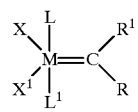

where M may be Os or Ru; R and R$^1$ may be the same or different and may be hydrogen or a substituent group including C$_2$–C$_{20}$ alkenyl, C$_2$–C$_{20}$ alkynyl, C$_1$–C$_{20}$ alkyl, aryl, C$_1$–C$_{20}$ carboxylate, C$_1$–C$_{20}$ alkoxy, C$_2$–C$_{20}$ alkenyloxy, C$_2$–C$_{20}$ alkynyloxy, aryloxy, C$_2$–C$_{20}$ alkoxycarbonyl, C$_1$–C$_{20}$ alkylthio, C$_1$–C$_{20}$ alkylsulfonyl and C$_1$–C$_{20}$ alkylsulfinyl; X and X$^1$ may be the same or different and may be any anionic ligand; and L and L$^1$ may be the same or different and may be neutral electron donor. The low grade DCPD starting materials containing less than about 97% by weight of DCPD monomers.

25 Claims, No Drawings

6,020,443

POLYMERIZATION OF LOW GRADE DCPD MONOMERS USING AN OLEFIN METATHESIS CATALYST

This application is a continuation-in-part of utility application filed on Dec. 2, 1996; with application Ser. No. 08/759,018, now U.S. Pat. No. 5,939,504 with title "METHOD FOR EXTENDING THE POT LIFE OF AN OLEFIN METATHESIS POLYMERIZATION REACTION"; with Attorney Docket No. APTI-110; and with inventors Charles S. Woodson and Robert H. Grubbs; which is incorporated herein by reference.

This application claims the benefit of U.S. Provisional application No. 60/011,284, filed on Feb. 8, 1996; with title "Polymerization of low grade DCPD monomers using an olefin metathesis catalyst"; with Attorney Docket No. APTI-200; and with inventors Charles S. Woodson and Robert H. Grubbs; which is incorporated herein by reference.

This application also claims the benefit of the U.S. Provisional application Ser. No. 60/037,373 filed on Feb. 4, 1997; with title "Polymerization of low grade DCPD monomers using an olefin metathesis catalyst"; with Attorney Docket No. APTI-210; and with inventors Charles S. Woodson and Robert H. Grubbs; which is incorporated herein by reference.

BACKGROUND

The present invention relates to polydicyclopentadiene (polyDCPD) materials and methods for synthesizing these materials. More particularly, the present invention relates to the use of Ring Opening Metathesis Polymerization (ROMP) reactions for synthesizing polyDCPD.

PolyDCPD is an extremely technologically and commercially important polymer material. It is a tough, rigid, thermoset polymer with high modulus, excellent impact strength, and excellent chemical resistance. As a result of these combination of properties, the material finds extensive use in a variety of applications that require toughness and chemical resistance including use in industrial housings, chlorine cell covers, waste water treatment equipment, water vehicles, and snow mobiles.

Because of the commercial importance of polyDCPD, there has been extensive research into methods for producing this material. One method that has attracted considerable attention is the production of polyDCPD by the ROMP of dicyclopentadiene (DCPD) monomers using a metathesis catalyst system. The polyDCPD produced via the ROMP reaction may be post cured to increase the cross-link density of the polyDCPD material. The original catalyst systems used for the ROMP of DCPD were of the Ziegler type. These catalysts were rather ill-defined, and were formed by the reaction of an early transition metal halide with a reducing agent such as an alkyl aluminum halide. A variety of other catalyst systems have also been developed based on tungsten or molybdenum; however, all of the previous catalyst systems have at least two important drawbacks.

First, the previous catalyst systems are all easily poisoned by impurities and the monomer starting material must therefore be highly purified and water and alcohols must be excluded from the reaction mixture. See for example U.S. Pat. No. 4,661,575 which states that "the presence of water interferes with polymerization of both the catalyst and the activator" and "the water content of the starting material should be below about 100 p.p.m." The monomer starting material used in the conventional processes usually consists of greater than about 99% pure DCPD monomer and this starting material is considerably more expensive than less pure, low grade, monomer. In fact, in the conventional processes the low grade, commercially available monomer must be preprocessed before it may be used as the starting material in the ROMP reaction. U.S. Pat. No. 4,661,575 states that "the preferred commercially available material [endo-DCPD] normally has a purity of 96–97%," and "the commercially available material should be purified to prevent impurities from inhibiting the polymerization." In addition to the added expense of purchasing and purifying the starting material for use in the conventional processes, a further drawback of having to use highly pure monomer is that the starting material must be stored under stringent conditions to ensure that it is not contaminated. These drawbacks result in increased cost and increased difficulty in handling of the raw materials; considerations which become extremely important in the large-scale production of poly-DCPD articles.

The second drawback of the conventional processes is that not only are the starting materials expensive and difficult to handle but the polyDCPD produced using these processes may possess undesirable physical characteristics. Most importantly, some of the polyDCPD formulations produced using the conventional catalyst systems are blackened or darkened in appearance and are opaque. The black color of these materials increases the difficulty of producing different colored polyDCPD articles by the addition of pigments or dyes to the polymer material. Additionally, since the materials are opaque they cannot be used in applications that require transparent or translucent materials. These undesirable physical characteristics reduce the possible uses of the conventionally produced materials in some industrially and commercially important applications.

For these reasons there exists a need for a method for producing polyDCPD that does not require the use of highly pure DCPD monomer as a starting material. It would further be desirable to produce a polyDCPD material that is transparent or translucent in the absence of additives and that can be produced in a variety of colors by the addition of dyes or pigments while still retaining excellent physical and chemical properties.

SUMMARY

The present invention addresses these needs by providing a method for producing polyDCPD that uses impure DCPD monomers as a starting material. The present invention also provides a polyDCPD material that is transparent or translucent in its natural state and possesses excellent properties such as corrosion resistance and toughness. The polyDCPD material of the present invention can also be produced in a variety of colors by the addition of dyes or pigments.

One embodiment of the invention is a method for producing polyDCPD via the ROMP of an impure DCPD starting material. In this method a Ruthenium or Osmium carbene complex catalyst is contacted with a DCPD starting material containing less than about 97% by weight of DCPD monomer. The specific Ruthenium or Osmium carbene complex catalysts that may be used include a Ruthenium or Osmium metal center that is in a +2 oxidation state, has an electron count of 16, and is pentacoordinated. These catalysts are stable in the presence of a variety of functional groups including hydroxyl, thiol, ketone, aldehyde, ester, ether, amine, imine, amide, nitro, carboxylic acid, disulfide, carbonate, isocyanate, carbodiimide, carboalkoxy, and halogen; therefore, the DCPD starting material may include impurities containing any of these functional groups. In addition, the DCPD monomers themselves may be functionalized with one or more of the above functional groups without poisoning the catalyst. A preferred version of the Ruthenium or Osmium carbene complex catalysts have the formula

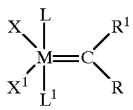

where M may be Os or Ru; R and $R^1$ may be the same or different and may be hydrogen or a substituent group including $C_2$–$C_{20}$ alkenyl, $C_1$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl; X and $X^1$ may be the same or different and may be any anionic ligand; and L and $L^1$ may be the same or different and may be neutral electron donor. The substituent R and $R^1$ groups may be substituted with one or more groups including $C_1$–$C_5$ alkyl, halide, $C_1$–$C_5$ alkoxy, and phenyl. The phenyl group may be substituted with one or more groups including halide, $C_1$–$C_5$ alkyl and $C_1$–$C_5$ alkoxy. In addition to the above groups, the substituent group may be substituted with one or more functional groups selected from the group consisting of hydroxyl, thiol, ketone, aldehyde, ester, ether, amine, imine, amide, nitro, carboxylic acid, disulfide, carbonate, isocyanate, carbodiimide, carboalkoxy, and halogen.

The preferred catalyst for use in the present invention has the formula

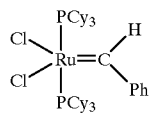

where Cy is cyclohexyl or cyclopentyl and Ph is phenyl.

In another embodiment of the invention, the ROMP reaction may be carried out in the presence of a gel modification additive which may be used to control the rate of the ROMP reaction. Suitable gel modification additives include electron donors and lewis bases. The preferred gel modification additive is triphenylphosphine.

Optionally, the DCPD starting material may contain a cross-linking agent for initiating additional post cure cross-linking reactions. Post cure cross-linking reactions may be initiated without the presence of a cross-linking agent; however, the additional cross-linking initiated by the cross-linking agent can lead to materials which possess superior chemical resistance properties.

Another embodiment of the invention provides a polyDCPD material that is translucent or transparent and may be colored by the incorporation of dyes or pigments. This transparent or translucent material may be produced by the ROMP polymerization of DCPD using the Ruthenium or Osmium carbene catalysts described above. The transparent or translucent polyDCPD material may be produced using the method described above; however, in contrast to the above method which is limited to using a DCPD starting material of less than about 97% by weight of DCPD monomer, the transparent or translucent polyDCPD material may be produced using a DCPD starting material of any purity.

DETAILED DESCRIPTION

We have found that using certain Ruthenium and Osmium carbene complex catalysts it is possible to catalyze the ROMP reaction of DCPD using an impure DCPD starting material. We have also found that using the Ruthenium and Osmium carbene complex catalysts with both pure and impure DCPD staring materials it is possible to produce a transparent or translucent polyDCPD material. As discussed in the background section, both of these aspects of the invention possess important advantages over the existing methods and materials. In this section, we first describe the Ruthenium and Osmium carbene complex catalysts that may be used in the present invention. In three separate subsections, we then describe the general characteristics of the DCPD starting materials, reaction conditions, and polyDCPD materials of the present invention. Finally, we present the results of specific experiments carried out to demonstrate embodiments of the present invention.

Catalysts that may be used in the present invention

The Ruthenium and Osmium carbene complex catalysts that may be used in the present invention and methods of synthesizing these catalysts are taught in this specification and the following references, all of which are incorporated herein by reference: U.S. Pat. Nos. 5,312,940 and 5,342,909; U.S. patent application Ser. Nos. 08/282,827 (filed Jul. 29, 1994), now abandoned, 08/282,826 (filed Jul. 29, 1994), now abandoned, and 08/693,789 (filed Jul. 31, 1996); now U.S. Pat. No. 5,831,108 and U.S. provisional patent application titled "Synthesis of Ruthenium Metathesis Catalysts from Ruthenium Hydride complexes", Application Ser. No. 60/031,088, filed Nov. 15, 1996, inventors Robert H. Grubbs, Tomas Belderrain, and Seth Brown, Attorney Docket No. CTCH-8600.

The Ruthenium and Osmium carbene complex catalysts of the present invention are stable in the presence of a variety of functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. Since the catalysts are stable in the presence of these groups, the DCPD starting material impurities, the DCPD monomers themselves, and any substituent groups on the catalyst may include one or more of the above listed groups without deactivating the catalysts.

Generally, the Ruthenium or Osmium carbene complex catalyst that may be used in the present invention include a Ruthenium or Osmium metal center that is in a +2 oxidation state, has an electron count of 16, and is pentacoordinated. These Ruthenium or Osmium carbene complex catalyst may have the formula

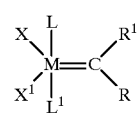

where M is Os or Ru

R and $R^1$ may be the same or different and may be hydrogen or a substituent group which may be $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, C2–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, halide, $C_1$–$C_5$ alkoxy, and phenyl. The phenyl group may optionally be substituted with one or more groups selected from halide, $C_1$–$C_5$ alkyl, and $C_1$–$C_5$ alkoxy. Optionally, the substituent group may be substituted with one or more functional groups selected from hydroxyl, thiol, ketone, aldehyde, ester, ether, amine, imine, amide, nitro, carboxylic acid, disulfide, carbonate, isocyanate, carbodiimide, carboalkoxy, and halogen. In a preferred embodiment, R and $R^1$ are the same or different and may be hydrogen, substituted aryl, unsubstituted aryl, substituted vinyl, and unsubstituted vinyl; where the substituted aryl and substituted vinyl are each substituted with one or more groups selected from hydroxyl, thiol, ketone, aldehyde, ester, ether, amine, imine, amide, nitro, carboxylic acid, disulfide, carbonate, isocyanate, carbodiimide, carboalkoxy, halogen, $C_1$–$C_5$ alkyl, $C_1$–$C_5$ alkoxy, unsubstituted phenyl, and phenyl substituted with a halide, $C_1$–$C_5$ alkyl or $C_1$–$C_5$ alkoxy.

X and $X^1$ may be the same or different and may generally be any anionic ligand. In a preferred embodiment, X and $X^1$ are the same or different and may be halogen, hydrogen or a substituent group selected from $C_1$–$C_{20}$ alkyl, aryl, $C_1$–$C_{20}$ alkoxide, aryloxide, $C_1$–$C_{20}$ alkyldiketonate, aryldiketonate, $C_1$–$C_{20}$ carboxylate, aryl or $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl. The substituent groups may optionally be substituted with $C_1$–$C_5$ alkyl, halogen, $C_1$–$C_5$ alkoxy or phenyl. The phenyl may be optionally substituted with halogen, $C_1$–$C_5$ alkyl or $C_1$–$C_5$ alkoxy. In a more preferred embodiment, X and $X^1$ are the same or different and may be Cl, Br, I, H or a substituent group selected from benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. The substituent groups may be optionally substituted with $C_1$–$C_5$ alkyl or a phenyl group. The phenyl group may optionally be substituted with halogen, $C_1$–$C_5$ alkyl or $C_1$–$C_5$ alkoxy. In an even more preferred embodiment, X and $X^1$ are the same or different and are selected from Cl, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate. In the most preferred embodiment, X and $X^1$ are both Cl.

L and $L^1$ may be the same or different and may generally be any neutral electron donor. In a preferred embodiment, L and $L^1$ may be the same or different and may be phosphines, sulfonated phosphines, phosphites, phosphinites, phosphonites, arsines, stibines, ethers, amines, amides, sulfoxides, carboxyls, nitrosyls, pyridines, and thioethers. In a more preferred embodiment, L and $L^1$ are the same or different and are phosphines of the formula $PR^3R^4R^5$ where $R^3$ is a secondary alkyl or cycloalkyl and $R^4$ and $R^5$ are the same or different and are aryl, $C_1$–$C_{10}$ primary alkyl, secondary alkyl, or cycloalkyl. In the most preferred embodiment, L and $L^1$ are the same or different and are -P(cyclohexyl)$_3$, -P(cyclopentyl)$_3$, or -P(isopropyl)$_3$. L and $L^1$ may also be -P(phenyl)$_3$.

Preferred catalysts for use in the present invention are ones where M is Ru; $R^1$ is hydrogen; R is substituted or unsubstituted aryl or substituted or unsubstituted vinyl; X and $X^1$ are Cl; and L and $L^1$ are triphenylphosphines or tricycloalkylphosphines such as tricyclopentylphosphine and tricyclohexylphosphine. The substituted aryl and substituted vinyl may each be substituted with one or more groups including $C_1$–$C_5$ alkyl, halide, $C_1$–$C_5$ alkoxy, and a phenyl group which may be optionally substituted with one or more halide, $C_1$–$C_5$ alkyl, or $C_1$–$C_5$ alkoxy groups. The substituted aryl and substituted vinyl may also be substituted with one or more functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

Particularly preferred embodiments of the Ruthenium or Osmium carbene complex catalyst include

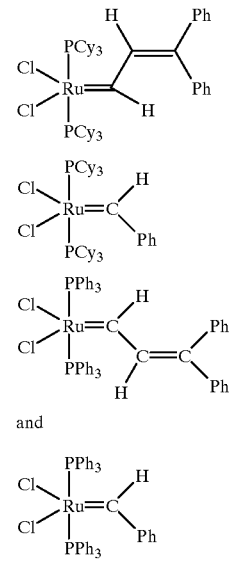

and

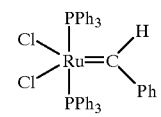

where Cy is cyclopentyl or cyclohexyl.

The most preferred embodiment of the Ruthenium or Osmium carbene complex catalyst is

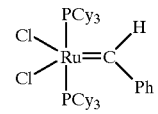

where Cy is cyclopentyl or cyclohexyl.

DCPD Starting Materials

The stability of the above Ruthenium and Osmium catalysts to a variety of functional groups allows the present invention to use DCPD starting materials of lower purity than has previously been possible. Specific experiments have shown that the Ruthenium and Osmium carbene complex catalysts described above can catalyze the ROMP of DCPD using starting materials containing as low as about 83% by weight of DCPD monomer. However, due to the stability of the catalysts, the lower limit on the purity of DCPD starting material that may be used is expected to be controlled as much by the desired physical characteristics of the polyDCPD material as by the poisoning of the catalyst. If the DCPD starting material contains too little DCPD monomer the resulting polymer may not have the structural integrity necessary to be useful in the desired applications. Thus the lower limit of the purity of the starting material used in the methods of the invention is a practical limit. Of course, the catalysts may be used with high purity DCPD starting material as well as with low grade, impure DCPD.

The DCPD monomers that may be used in the present invention include both the endo and exo isomers. In addition, the functional group tolerance of the Ruthenium and Osmium carbene catalysts means that the DCPD monomers may be functionalized to include one or more functional groups. Unless otherwise stated, "DCPD monomer" means either unfunctionalized or functionalized DCPD monomer. The DCPD monomers may be functionalized with a variety of functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

The DCPD starting material may include a variety of impurities including water, alcohols, aromatic or non-aromatic organic species and inorganic species. Specific examples of impurities that may be present include water, alcohols, C5 and C6 cracking fractions, benzene, toluene, cyclopentadiene, and C-9, C-10 and C-11 codimers. Additionally, the DCPD starting material may include trimers and higher oligomers of DCPD. The functional group tolerance of the Ruthenium and Osmium carbene catalysts means that the impurities may include a variety of functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

The DCPD starting material may optionally include one or more gel modification additives which are added to control the pot life of the reaction mixture. The use of gel modification additives is described in detail in utility application filed on Dec. 2, 1996; with application Ser. No. 08/759,018; now U.S. Pat. No. 5,939,504 with title "METHOD FOR EXTENDING THE POT LIFE OF AN OLEFIN METATHESIS POLYMERIZATION REACTION"; with Attorney Docket No. APTI-10; and with inventors Charles S. Woodson and Robert H. Grubbs; which is incorporated herein by reference. Generally, the gel modification additive may an electron donor or Lewis base. In a preferred embodiment, the gel modification additive is a neutral electron donor or a neutral Lewis base such as phosphines, sulfonated phosphines, phosphites, phosphinites, phosphonites, arsines, stibines, ethers, amines, amides, sulfoxides, carboxyls, nitrosyls, pyridines, thioethers, nitriles, thiophenes, and furans. The electron donor or Lewis base may optionally contain one or more functional groups selected from the group consisting of hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen. In a more preferred embodiment, the gel modification additive may be triphenylphosphine, tricyclopentylphosphine, tricyclohexylphosphine, triphenylphosphite, pyridine, propylamine, tributylphosphine, benzonitrile, triphenylarsine, anhydrous acetonitrile, thiophene, or furan. The preferred gel modification additives include P(cyclohexyl)$_3$, P(cyclopentyl)$_3$, P(isopropyl)$_3$, P(Phenyl)$_3$, and pyridine. Triphenylphosphine is the most preferred gel modification additive.

The DCPD staring material may optionally include one or more cross-linking agents for initiating additional post cure cross-linking of the polyDCPD. The use of cross-linking agents is described in detail in application Ser. No. 08/678, 397; now U.S. Pat. No. 5,728,785, filed Jul. 2, 1996; titled "PEROXIDE CROSSLINKING OF ROMP POLYMERS"; by inventors Robert H. Grubbs and Charles S. Woodson; which is incorporated herein by reference. Preferred cross-linking agents are peroxides, such as alkyl peroxides, particularly tert-butyl peroxide or di-t-butyl peroxide, 2,5-dimethyl-2,5-di-(tert-butylperoxy) hexyne-3, 2,5-dimethyl-2,5-di-(tert-butylperoxy) hexane or mixtures thereof. The amount of peroxide in the reaction mixture is preferably between 0.01 v % to 10 v % of the total DCPD starting material/catalyst/crosslinking agent mixture.

The DCPD starting material may optionally include additives such as fillers, binders, plasticizers, pigments, dyes etc, as is known in the art. However, because of the functional group tolerance of the catalysts, the range of available additives may be much greater than has been possible using the conventional catalyst systems. Importantly, the DCPD starting material may include pigments and dyes which allow for the production of polyDCPD articles of different colors. As stressed above, this is a great advantage over the previous methods which could not produce colored polyD-CPD material. Pigments that have been used to color the polyDCPD material of the present invention include Series 34 pigments manufactured by Ferro Corporation of Cleveland, Ohio. These pigments include a polyether polyol carrier, and specific examples used include 34-58000 (pigment blue 15 a copper phthalocyanine pigment, 50%–75% carrier) 34-88030 (5%–20% carbon black, >75% carrier), 34-18000 (white, 20%–50% carrier, 50%–75% TiO$_2$), and 34-48000 (C.I. pigment green 7 a chlorinated copper phthalocyanine pigment, 50%–75% carrier).

Reaction and Processing Conditions

Generally the ROMP of DCPD is carried out by adding the desired Ruthenium or Osmium carbene complex catalyst to the DCPD starting material which has been heated to a starting resin temperature. Alternatively, the catalyst may be first added to the DCPD starting material and the mixture then heated to the required temperature. The starting resin temperature is not critical; but, as is known, this temperature does affect the rate of the polymerization reaction. The ratio of catalyst to starting material is not critical. Ratios of catalyst to starting material of between about 1:100 and 1:15,000 by weight are preferred. The polyDCPD material produced using catalyst/starting material ratios of less than about 1:15,000 are soft and rubbery and may therefore not be useful in applications requiring tough rigid materials; such materials may however be useful in other applications requiring different physical properties. The invention may be practiced using catalyst/starting material ratios outside of the above range. The DCPD starting material may optionally be refluxed, filtered, and degassed before the catalyst is added; although, none of these procedures is necessary to practice the invention.

If a gel modification additive, cross-linking agent, or other additive is used it is preferred that the additives be added before the catalyst; although, this is not critical.

Although it is preferred that the reaction be conducted in the absence of a solvent this is not critical. Possible solvents that may be used include organic, protic, or aqueous solvents which are inert under the reaction conditions. Examples of suitable solvents may include aromatic hydrocarbons, chlorinated hydrocarbons, ethers, aliphatic hydrocarbons, alcohols, water, or mixtures thereof.

After polymerization is complete (i.e., after the article has "cured") the polyDCPD article may be post cured to initiate increased cross-linking. As is known, additional cross-linking may be accomplished by post-curing at an elevated temperature. As is well known in the art, other methods may be used to post-cure the polyDCPD material.

Unlike previous catalyst systems, the catalyst/DCPD starting material mixture of the present invention may remain liquid for a considerable period of time depending on the temperature and the amount of gel modification additive present. This characteristic of the present catalyst system allows polyDCPD articles to be made using a variety of polymer processing techniques including molding, open molding, casting, surface coating, filament winding, vacuum impregnation, pouring, RIM, RTM, and others known in the art.

PolyDCPD Material

Unless otherwise stated, "polyDCPD material" means either a post-cured or non-post-cured material; that is, either a material in which the DCPD polymer chains are substantially cross-linked or a material in which the DCPD polymer chains are not substantially cross-linked. In addition, unless otherwise stated, "polyDCPD material" means a polymer produced using either functionalized or unfunctionalized DCPD monomers.

As discussed above, the polyDCPD materials of the present invention possess physical properties which allow them to overcome some of the drawbacks inherent in the previous materials. One of the most visually useful properties of the materials of the present invention is that they can be made transparent or translucent to visible light while retaining excellent chemical and physical properties. These properties allow articles manufactured using the polyDCPD of the present invention to be used in a variety of applications for which the previous, opaque materials could not be used. For example, it is easily possible to read a newspaper article through a 0.5" thick piece of polyDCPD material of the present invention. This example gives a qualitative measure of the transparency of the polyDCPD according to the present invention. The relatively clear, translucent polyDCPD of the present invention also allows polyDCPD articles to be produced in a variety of colors by the addition of various pigments or dyes.

EXPERIMENTAL RESULTS

In this section, we present the results of experiments demonstrating the use of low grade DCPD starting materials in the ROMP reactions of the present invention. In subsections 2–5, we present the results of experiments using 81%–86% DCPD starting material; then, in sub-section 6, we present the results of experiments using other low grade DCPD starting materials; and, in sub-section 7, we present the results of experiments using low grade DCPD starting materials with gel modification additives.

1. Synthesis of Ruthenium Complex Catalysts

The specific catalysts used in the experiments below may be synthesized using methods described in the references listed in the Catalyst section above.

2. Composition of 81%–86% Low Grade DCPD Monomer

The % composition by weight of the components of the 81%–86% DCPD monomer used in the experiments in Sections 3 and 5 are as follows:

C5's & C6's 0.01

Benzene 0.01

Toluene 0

CPD 0.22

C-9 Codimers 1.9

C-10 Codimers 10.53

DCPD 82.94

C-11 Codimers 4.39

3. DCPD Polymerization Experimental Procedure

The following are examples of the experimental procedures used in the experiments reported in Section 5.

a. Polymerization Without Reflux Pretreatment of DCPD Monomer.

Low grade 81%–86% DCPD (80.86 g, 5000 equiv) was added to a flask containing a stir bar and was heated to a starting resin temperature of about 64° C. (P(Cyclopentyl)$_3$)$_2$Cl$_2$RuCHCHPh$_2$ (90 mg, 1 equiv) was then added to the mixture and a slow flow of argon was introduced into the flask. The solution was stirred and at about 2 minute intervals, a small amount of the solution was removed and an Acetone test conducted (See 4, below). When the Acetone test gave a "Flat Ball" result, i.e. some polymerization of the mixture has started, the solution was poured open to air into a mold that had been previously stored at about 60° C. The time from initial mixing of the monomer and catalyst until pouring is called the "pour time" of the polymerization reaction mixture. In the present example the solution was poured after about 10 minutes. The temperature of the reaction was then monitored and the time and temperature of the peak exotherm temperature recorded. After the reaction was complete, the polyDCPD article was removed from the mold.

b. Polymerization With Reflux Pretreatment of DCPD Monomer.

In this procedure, the low grade 81%–86% DCPD monomer was refluxed prior to the addition of the catalyst. The procedure was as above except that after the DCPD has been added to the flask, and prior to adding the catalyst, the temperature of the DCPD was raised to between about 150° C to about 180° C. and the DCPD was refluxed at this temperature for a reflux time. In the results reported here the DCPD monomer was refluxed for about 1 to 8 hours. After refluxing, the DCPD was cooled to the starting resin temperature, the catalyst was added, the Acetone tests carried out, the reaction mixture poured into the mold, the exotherm temperature recorded, and the polyDCPD article subsequently removed from the mold.

c. Polymerization With Peroxide Modifier

In this procedure a peroxide modifier, for initiating additional post cure cross-linking, was added to the low grade 81%–86% DCPD monomer at the same time as the catalyst. An example of this procedure is as follows:

Filtered (with aluminum oxide to remove any inhibitors such as 4-tert-butylcatechol) Low grade 81%–86% DCPD (67.639 g, 5000 equiv) was added to a flask containing a stir bar, and was heated to a starting resin temperature of about 24° C. Tert-Butyl Peroxide (2.005g, 3% v/v), and (P(Cyclopentyl)$_3$)$_2$Cl$_2$RuCHCHPh$_2$ (75 mg, 1 equiv) were then added to the mixture and a slow flow of argon was introduced into the flask. The solution was stirred and at about 2 minute intervals, a small amount of the solution was removed and an Acetone test conducted (See 4, below). When the Acetone test gave a "Flat Ball" result, i.e. some polymerization of the mixture has started, the solution was poured open to air into a mold that had been previously stored at about 60° C. The time from initial mixing of the monomer and the catalyst until pouring is called the "pour time" of the polymerization reaction mixture. In the present example the solution was poured after about 10 minutes. The temperature of the reaction was then monitored and the time and temperature of the peak exotherm temperature recorded. After the reaction is complete, the polyDCPD article was removed from the mold.

Optionally, the DCPD monomer may be refluxed prior to the addition of the tert-butyl peroxide and the catalyst.

4. Acetone Test

The Acetone Test is used to measure the extent of the polymerization reaction. In this test, a few drops of the catalyzed DCPD reaction mixture are removed with a small pipet and dropped into a test tube of acetone. Visual inspection yields a qualitative measure of the extent of polymer formation. The visual results are described as "Nothing" (no polymerization), "Cloud", "Flat Ball" (some polymerization), and "Ball."

5. Dependence of Pot life and Peak Exotherm on Reflux Time, Mold Temperature, and Resin Temperature The experimental procedures described above were carried out for different reflux times, different mold and resin temperatures, and different concentrations of peroxide. For each of the experiments the gel time, i.e. time between mixing and polymerization, and the time to peak exotherm were recorded. These results are summarized in Table 1.

In all cases the catalyst successfully polymerized the low grade 81%–86% DCPD monomer to give polyDCPD.

TABLE 1

| Experiment | T-Butyl Peroxide | Monomer/ Catalyst | Reflux Time | Resin Temp [° C.] | Mold Temp [° C.] | Gel Time [min, approx.] | Peak Exotherm Time [min:sec] | Peak Exotherm Temp [° C.] |
|---|---|---|---|---|---|---|---|---|
| A1[a] | No | 5000:1 | No Reflux | 64 | 60 | >30 | — | — |
| A2 | No | 5000:1 | 1 hr. 5 min. | 60 | 60 | 6 | 6:50 | 138.1 |
| A3[a] | No | 5000:1 | 1 hr. 5 min. | 45 | 60 | >10 | — | — |
| A4 | No | 5000:1 | 8 hr. | 41 | 40 | 3.5 | 6:29 | 156.5 |
| A5 | No | 5000:1 | 8 hr. | 24 | 61.5 | 15 | 16:15 | 174.5 |
| A6 | Yes | 5000:1 | 8 hr. | 24 | 60 | >14 | 16:50 | 166.1 |

[a]No peak Exotherm was observed for samples A1 & A3.

6. Experiments B1–B7 using other low grades of DCPD Monomers

The following experiments (#s B1–B7) were carried out to demonstrate that the present invention may be practiced using low grade DCPD monomer starting materials of different purities and with or without gel modification additives.

Experiment #B1

Unfiltered, Refluxed 81–86% DCPD without Gel Modification Additive

Pour into a 250-ml flask with stir bar approximately 87 grams of a Texmark 81–86% DCPD that has been refluxed for 8-hrs. Do not filter. Put the DCPD into a 40.5° C. bath to equalize temperature. Add 0.066g of catalyst (P(Cyclopentyl)$_3$)$_2$ Cl$_2$RuCHPh. Mix for approx. 2-minutes. At this point the acetone test shows a "round ball" degree of polymerization. Pour into a 50° C.mold. Peak temperature 149.5° C. at 6-minutes and 31-seconds. 264psi HDT was 99.5° C. after a 1-hr. post cure at 200° C.

Experiment #B2

Unfiltered, unrefluxed 94% DCPD without Gel Modification Additive

Pour into a 250-ml flask with stir bar approximately 64 g of Lyondell 94% DCPD. Do not filter or degass. Add 0.079g of catalyst (P(Cyclohexyl)$_3$)$_2$ Cl$_2$RuCHPh and mix for 3-minutes. Beginning monomer temperature was room temperature. Pour into 45° C. mold. At 43-minutes polymer temperature is approximately the same as the mold temperature, 49.9° C. The sample is very soft to the touch. The mold temperature is increased to 76–78° C. At 63.5-minutes a noticeable exotherm occurs. Peak temperature was 87.1° C. @ 63.5-minutes. Test stops 95-minutes. The sample is much harder. Sample post cured for 1.25-hr. @ 130° C.

Experiment #B3

Unfiltered unrefluxed 94% DCPD with Gel Modification Additive

Pour into a 500-ml flask with stir bar approximately 300 g of Lyondell 94% DCPD. Do not filter or degass. Add 0.187g of triphenylphosphine and mix until dissolved. Then add catalyst (P(Cyclohexyl)$_3$)$_2$ Cl$_2$RuCHPh 0.425 g and mix. Mold approx. 32° C. and monomer at room temperature. Peak of 47° C. @ 23.5-minutes. After 27.5-minutes added additional mold heat. At 55.5-minutes test concluded with polymer and mold temperature approx. 61° C. After post cure 1-hr. and 10-minutes @ 135° C. sample is very hard with a 264psi HDT of 120.5° C.

Experiment #B4

Filtered, unrefluxed 94% DCPD with Gel Modification Additive

Pour into a 250-ml flask with stir bar approx. 64 g of Lyondell 94% DCPD that has been filtered and then degassed for about 10-minutes. Add 0.055 g of triphenylphosphine and mix for 5-minutes. Add catalyst (P(Cyclohexyl)$_3$)$_2$ Cl$_2$RuCHPh, 0.054 g and mix for 3-minutes. Mold temperature about 38° C. Monomer temperature about 32° C. Gel in about 29-minutes. Left sample in the mold overnight. Next day sample was very firm but possibly slightly soft on top. Post cured for 1.25-hrs. @ 130° C. 264 psi was 114° C.

Experiment #B5

(Filtered, unrefluxed 94% DCPD without Modification Additive

Pour into a 250-ml flask with stir bar approx. 300 g of Lyondell 94% DCPD. Filter and degass. Add 0.247 g of catalyst (P(Cyclopentyl)$_3$)$_2$ Cl$_2$RuCHPh and mix. Pour into 33° C. mold. Monomer at the beginning of the reaction was room temperature. Had gel at 22-minutes. Peak exotherm was approx. 50° C.(maximum observed).

Experiment #B6

Filtered, unrefluxed 94% DCPD without Gel Modification Additive

Repeat procedure for example B5 above but raise temperature of the mold to 44.1° C. Peak exotherm observed at 7-minutes and 147.4° C.

Experiment #B7

Filtered, unrefluxed 94% DCPD without Gel Modification Additive

Repeat procedure for example B6 above but lower mold temperature to 41:5° C. and increase catalyst ratio to 3750:1. Peak at 5-minutes and 35-seconds @ 192° C.

7. Use of low grades of DCPD Monomers with Gel Modification Additive

We performed the following experiments to demonstrate the use of a gel modification additive with low grade DCPD monomer:

Purification and Degassing of DCPD Monomer 500 mL DCPD was filtered under vacuum into a one liter round bottom flask through a 150 mL medium porosity sintered glass fritted funnel containing one inch of aluminum oxide. Lower grades of DCPD with lower freezing points can be used after similar purifying treatment.

To the round bottom flask, containing purified DCPD as above, was added a 1-inch magnetic stir bar. The flask was placed in a water bath 30–35° C. and under 0.10 mm Hg vacuum with stirring for from 20 minutes to 1 hour. The degassed DCPD was then stored under vacuum and protected from light to prevent premature free radical polymerization.

We have found that due to the functional group tolerance of the catalysts of the present invention, we do not need to purify and degass the DCPD monomer before carrying out the polymerization.

DCPD Polymerization Without Gel Modification Additive using P(Cyclopentyl)$_3$)$_2$Cl$_2$Ru(=CHCH=CPh$_2$) catalyst To a 250 mL Erlenmeyer flask containing a 1-inch magnetic stir bar, DCPD, purified and degassed, as described above, (147.9 g, 150 mL, 1.12 mol, 5000 eq) and (P(Cyclopentyl)$_3$)$_2$Cl$_2$Ru(=CHCH=CPh$_2$) (188.5 mg, 0.224 mmol, 1 eq) were added. Stirring was initiated and optionally a slow flow of argon was introduced into the flask. The orange solution was stirred at room temperature for 8 minutes under argon until it became highly viscous. The solution was then poured open to air into a crystallization dish (14.6 cm in diameter) that had been previously stored at 120° C. After 2 minutes, the solution began to gel, and the production of smoke was observed over the following 2 minutes. At this point, the polymerization appeared complete, and the crystallization dish cooled to room temperature. The polymer separated from the sides of the crystallization dish easily. The polymer was post-cured at 120° C. for 3 hours, resulting in poly(DCPD) (141.1 g, 95.4% yield).

DCPD Polymerization with Gel Modification Additive using P(Cyclopentyl)$_3$)$_2$Cl$_2$Ru(=CHCH=CPh$_2$) catalyst.

To a flask containing a stir bar, triphenylphosphine (95 mg), and DCPD, purified and degassed, as described above, (63.991 g) were added. The flask was stirred under vacuum for about 5 minutes.

(P(Cyclopentyl)$_3$)$_2$Cl$_2$Ru(=CHCH=CPh$_2$) (71 mg) was then added to the mixture and a slow flow of argon was introduced into the flask. The solution was then stirred at room temperature under argon. After 59 minutes, the acetone test (See below) gave a "Flat Ball" result. The solution was then poured open to air into a mold that had been previously stored at 60.2° C. The peak temperature of the reaction occurred about 10 minutes after pouring, with a peak temperature of about 158° C.

Dependence of pot life on concentration of Gel Modification Additive using P(Cyclolpentyl)$_3$)$_2$Cl$_2$Ru(=CHCH=CPh$_2$) catalyst: TABLE 2

203 mg of triphenylphosphine was added to 4.052g of 95% DCPD in a test tube and the test tube shaken until the triphenylphosphine was dissolved. 74 mg of (P(Cyclopentyl)$_3$)$_2$Cl$_2$Ru(=CHCH=CPh$_2$) was then added, shaken by hand and then mixed with a stir bar for about 1–2 minutes. The mixture was then set aside. After 3 hours 20 minutes, the mixture was still fluid, i.e. only partial polymerization had occurred. The pot life of this reaction mixture is therefore greater than 3 hours 20 minutes. The reaction mixture was added to 60.06 g of DCPD. The mixture was stirred slowly under vacuum (this is optional) for a further 5 minutes and then poured into a mold that had been preheated to 60.8° C. The peak exotherm occurred after about 19 minutes at a temperature of about 69.5° C. The mold was then allowed to cool to room temperature and the polymer removed from the mold and post cured at 190° C. for 1 hour.

The experimental procedure described above was carried out for different concentrations of the gel modification additive and the results are summarized in Table 2.

TABLE 2

| Experiment | Monomer/Catalyst | PPh$_3$ (g) | Catalyst (g) | Pot Life+ | Peak Exotherm time (min) |
|---|---|---|---|---|---|
| 1 | 5000:1 | .203 | .074 | >3 hr 20 min | 19 |
| 2 | 5000:1 | .079 | .071 | 2 hr 14 min | ~6 |
| 3 | 5000:1 | .044 | .071 | 49 min | ~4 ½ |

+The pot life for Experiments 2 and 3 is the time at which the polymerization mixture is becoming viscous but can still be poured.

DEPENDENCE OF GEL TIME ON CONCENTRATION OF GEL MODIFICATION ADDITIVE: TABLE 3

USING CATALYST (P(Cyclohexyl)$_3$)$_2$ Cl$_2$RuCHPh

The following reactions were carried out using a catalyst of the formula (P(Cyclohexyl)$_3$)$_2$ Cl$_2$RuCHPh the results of which are summarized in Table 3. The Experiment numbers relate to the entries in Table 3.

Experiment #4

Pour into a 250 ml flask with stir bar approximately 64.6 g of Velsicol VHP DCPD (about 99% DCPD monomer) that has been filtered and degassed with vacuum. (Note: filtering and degassing are optional). Add 0.054g of catalyst (P(Cyclohexyl)$_3$)$_2$ Cl$_2$RuCHPh and stir for about 3 minutes. Pour into mold. Mold temperature was 34.4° C. and the DCPD monomer temperature 31.5° C. Gel time was <2 minutes & 45 seconds with peak exotherm at 4 minutes & 11 seconds and a peak temperature of 133.8° C.

Note: Gel time is defined as a) the time at which a stir bar ceases turning in a 250-ml flask during mixing of the catalyst/monomer; or b) the time at which a glass pipet lowered or pushed into a very high viscosity poured sample will no longer pick up or have "cling to" the pipet any of the polymerizing sample.

Experiment #5

Pour into a 250-ml flask with stir bar approximately 64.0 g of Velsicol VHP DCPD that has been filtered and degassed with vacuum. (Note: filtering and degassing are optional). Add 0.030g of triphenylphosphine and mix for about 5 minutes. Add 0.054g of catalyst (P(Cyclohexyl)$_3$)$_2$ Cl$_2$RuCHPh and stir for about 3 minutes. Pour into mold. Mold temperature was 35.0° C. and the DCPD monomer temperature 31.5° C.

Experiment #6

Pour into a 250-ml flask with stir bar approximately 64.0 g of Velsicol VHP DCPD that has been filtered and degassed with vacuum. (Note: filtering and degassing are optional). Add 0.065 g of triphenylphosphine and mix for about 5 minutes. Add 0.054 g of catalyst (P(Cyclohexyl)$_3$)$_2$ Cl$_2$RuCHPh and stir for about 3 minutes. Pour into mold. Mold temperature was 37.8° C. and the DCPD monomer temperature 33° C.

Experiment #7

Pour into a 250-ml flask with stir bar approximately 64.0 g of Velsicol VHP DCPD that has been filtered and degassed with vacuum. (Note: filtering and degassing are optional). Add 0.200 g of triphenylphosphine and mix for about 5 minutes. Add 0.054 g of catalyst (P(Cyclohexyl)$_3$)$_2$ $Cl_2RuCHPh$ and stir for about 3 minutes. Pour into mold. Mold temperature was 36.3° C. and the DCPD monomer temperature 31 ° C.

Experiment #8

In a 25×150mm test tube, add approximately 8.132 g of Velsicol VHP DCPD that has been filtered and degassed with vacuum. (Note: filtering and degassing are optional). Add 0.060 g of triphenylphosphine and mix until dissolved—about 3–5 minutes. Add 0.054 g of catalyst $(P(Cyclohexyl)_3)_2$ $Cl_2RuCHPh$ and stir for about 3 minutes. Then put test tube into a dry ice/acetone bath for approximately 30 seconds to cool, and then put sample into a 35° F. refrigeration and leave overnight.

The following day, weigh out about 56 g of Velsicol VHP that has been filtered and degassed with vacuum. (Note: filtering and degassing are optional). Add the frozen Catalyst/TriPhenylPhosphine/DCPD concentrate pellet to the 56 g of DCPD monomer and mix until dissolved—about 49 seconds. Resin temperature is 35° C. Mix for 3 minutes longer and pour into a 33.8° C. mold. Resin temperature at pour =35.4° C.

Experiment #9

In a 250-ml flask with stir bar add approximately 64.0 g of Lyondell 108 94.04% DCPD that has been filtered and degassed with vacuum. Add 0.055 g of Triphenylphosphine and mix for about 5 minutes. Add 0.054 g of catalyst $(P(Cyclohexyl)_3)_2$ $Cl_2RuCHPh$ and mix for about 3 minutes. Pour into mold. Mold temperature is 38° C. and the DCPD monomer temperature 32° C.

Experiment #10

In a 250-ml flask with stir bar add approximately 64.0 g of Lyondell 108 94.04% DCPD that has been filtered and degassed with vacuum. Add 0.054 g of catalyst $(P(Cyclohexyl)_3)_2$ $Cl_2RuCHPh$ and mix for 3 minutes. Pour into mold. Mold temperature is 38° C. and the DCPD monomer temperature 32° C.

Experiment #11

Pour into a 250-ml flask with stir bar approximately 64.1 g of Velsicol VHP DCPD that has been filtered and degassed with vacuum. (Note: filtering and degassing is optional). Add 0.200 g of triphenylphosphine and mix for about 5 minutes. Add 0.080 g of catalyst $(P(Cyclohexyl)_3)_2Cl_2RuCHPh$ and stir for about 3 minutes. Pour into mold. Mold temperature was 32° C. and the DCPD monomer temperature 33° C.

Experiment #12

In a 25×150mm test tube, add approximately 6.0 g of Velsicol VHP DCPD that has been filtered and degassed with vacuum. (Note: filtering and degassing are optional). Add 0.011 g of triphenylphosphine and mix until dissolved—about 3-S minutes. Add 0.054 g of catalyst $(P(Cyclohexyl)_3)_2Cl_2RuCHPh$ and stir for about 3 minutes. Put 58 g of Velsicol VHP DCPD into a flask and mix in test tube with Catalyst/Monomer/TriPhenylPhosphine mix for one minute. Pour into mold. Mold temperature is 37.9° C. Resin temperature about 31.8° C.

DEPENDENCE OF GEL TIME ON GEL MODIFICATION ADDITIVE: TABLE 4

The following experiments use a similar format to those set forth in Table 3, but the gel modification additive was varied. The results of these experiments are summarized in Table 4. These experiments used two different catalysts: $(P(Cyclohexyl)_3)_2Cl_2RuCHPh$ and $(PPh_3)_2Cl_2Ru(=CHCH=CMe_2)$. Other than for the five specific experiments described below (Experiment #s 29–33), all results presented in Table 4 are for the $(P(Cyclohexyl)_3)_2Cl_2RuCHPh$ catalyst. The Experiment numbers relate to the entries in table 4.

USING CATALYST $(P(Cyclohexyl)_3)_2ClRuCHPh$: Experiment #s 13–28

In a 250-mL flask approximately 64.0 g of filtered and degassed Velsicol VHP DCPD was added. The gel modification additive was added. After mixing until dissolved or 5 minutes, the catalyst $(P(Cyclohexyl)_3)_2$ $Cl_2RuCHPh$ was added. After mixing for about 3 minutes (or less if gelation had occurred) the mixture was poured into a mold.

USING CATALYST $(PPh_3)_2$ $Cl_2Ru(=CHCH=CMe_2)$: Experiment #s 29–33

The following reactions were carried out using the $(PPh_3)_2Cl_2Ru(=CHCH=CMe_2)$ catalyst.

Experiment 29

Pour into a 250-ml flask with stir bar approximately 64.0 g of Velsicol VHP DCPD that has been filtered and degassed with vacuum. (Note: filtering and degassing are optional). Add 0.020 g of tricyclohexylphosphine and mix for about 5 minutes. Add 0.049 g of catalyst $(PPh_3)_2Cl_2Ru(=CHCH=CMe_2)$ and mix for 3 minutes. Pour into mold. Mold temperature was 39.2° C. and the Resin temperature 33.6° C.

Experiment 30

Pour into a 250-ml flask with stir bar approximately 64.0 g of Velsicol VHP DCPD that has been filtered and degassed with vacuum. (Note: filtering and degassing are optional). Add 0.054 g of tricyclohexylphosphine and mix for about 5 minutes. Add 0.049 g of catalyst $(PPh_3)_2Cl_2Ru(=CHCH=CMe_2)$ and mix for 3 minutes. Pour into mold. Mold temperature was 37.5° C. and the resin temperature ≈32.0° C.

Experiment #31

Pour into a 250-ml flask with stir bar approximately 64.0 g of Velsicol VHP DCPD that has been filtered and degassed with vacuum. (Note: filtering and degassing are optional). Add 0.032 g of tricyclohexylphosphine and mix for about 5 minutes. Add 0.049 g of catalyst $(PPh_3)_2Cl_2Ru(=CHCH=CMe2)$ and mix for 3 minutes. Pour into mold. Mold temperature was 39.3° C. and the resin temperature 32.0° C.

Experiment 32

Pour into a 250-ml flask with stir bar approximately 64.0 g of Velsicol VHP DCPD that has been filtered and degassed with vacuum. (Note: filtering and degassing are optional). Add 0.049 g of catalyst $(PPh_3)_2Cl_2Ru(=CHCH=CMe_2)$ and mix for 3 minutes. Pour into mold. Mold temperature was 40.6° C. and the Resin temperature 34.0° C.

Experiment #33

In a 25×150 mm test tube, add 0.051 g of catalyst $(PPh_3)_2Cl_2Ru(=CHCH=CMe_2)$ and 4–6 g of dichloromethane. Add stir bar and mix for about 5 minutes or until catalyst appears to dissolve. Then add 0.052 g tricyclohexylphosphine and purge test tube with argon. Cap test tube and mix at room temperature for 2 hours. After 2 hours, pull off dichloromethane with a vacuum and wash catalyst mixture with another dichloromethane wash. Now add approximately 10.0 g of Velsicol VHP DCPD that has not been filtered or degassed, to the test tube and mix rapidly for about 1 minute or until the catalyst mixture is dissolved in the DCPD. Add the DCPD/catalyst mixture to a flask containing 54.0 g of Velsicol VHP DCPD that has not been filtered or degassed. Continue mixing for about 3 minutes total mix time. Pour into mold. Mold temperature was 38.3° C. and the resin temperature 32.0° C.

TABLE 3

Triphenylphosphine Level vs. Gel Time

| Experiment # | Monomer/ Catalyst | Weight DCPD (g) | PPh₃ (g) | Catalyst (g) | Mold Temp. °C. | Resin Temp. °C. | Gel Time (min) | Peak Exotherm Time (min) | Peak Exotherm Temp. °C. | Part Cure Schedule | 264 psi HDT °C. |
|---|---|---|---|---|---|---|---|---|---|---|---|
| 4  | 7500:1 | 64.6  | 0    | .054 | 34.4 | 31.5 | <2.75   | 4.18  | 133.8 | a | 59    |
| 5  | 7500:1 | 64.0  | .030 | .054 | 35.0 | 31.5 | 11.00   | 16.28 | 143.6 | a | 122.5 |
| 6  | 7500:1 | 64.0  | .065 | .054 | 37.8 | 33.0 | 25.00   | 27.00 | 42.0  | a | 126.5 |
| 7  | 7500:1 | 64.0  | .200 | .054 | 36.3 | 31.0 | >99.00  | 53.00 | 37.6  | a | 69    |
| 8  | 7500:1 | 64.0  | .060 | .054 | 33.8 | 35.4 | 16.00   | 17.00 | 38.2  | a | 130   |
| 9  | 7500:1 | 64.0  | .055 | .054 | 38.0 | 32.0 | >109.00 | —     | —     | a | 114   |
| 10 | 7500:1 | 64 g  | 0    | .054 | 38.0 | 32.0 | <7.00   | 18.58 | 68.3  | a | 109   |
| 11 | 5000:1 | 64.1 g| .200 | .080 | 32.0 | 33.0 | >154.00 | —     | —     | a | 128   |
| 12 | 7500:1 | 64.0  | .011 | .054 | 37.9 | 31.8 | <4.00   | 9.56  | 161.1 | — | —     |

Cure Schedule
a: 1 hour and 15 minutes @ 130° C.

TABLE 4

Gel Modification Additives vs. Gel Time

| Experiment # | Weight of Catalyst (g) | Weight of DCPD (g) | Gel* Modification Additive | Gel* Additive Amount | Mold Temp °C. | Resin Temp. °C. | Gel Time (min) | Peak Exotherm Time (min) | Peak Exotherm Temp. °C. |
|---|---|---|---|---|---|---|---|---|---|
| 13 | .054 | 64.0 | #1   | .010 g  | 36.4 | 31.0 | 6.00    | 7.33  | 160.3 |
| 14 | .054 | 64.0 | #1   | .028 g  | 36.2 | 31.0 | 9.00    | 10.83 | 173.2 |
| 15 | .054 | 64.0 | #1   | .073 g  | 36.3 | 31.0 | 21.00   | 38.30 | 91.5  |
| 16 | .054 | 64.1 | #2   | .069 g  | 38.6 | 33.3 | 6.00    | 7.20  | 190.4 |
| 17 | .054 | 64.0 | #2   | .150 g  | 36.3 | 33.2 | 11.00   | 13.75 | 184.9 |
| 18 | .054 | 64.0 | #3   | .084 g  | 35.9 | 32.5 | none    | none  | none  |
| 19 | .054 | 64.0 | #4   | .061 g  | 37.1 | 31.0 | 10.00   | 15.10 | 145.1 |
| 20 | .054 | 64.0 | #5   | .046 g  | 36.6 | 32.0 | none    | none  | none  |
| 21 | .054 | 64.6 | #6   | .062 g  | 35.0 | 31.0 | none    | none  | none  |
| 22 | .056 | 64.0 | #7   | .066 g  | 33.1 | 32.0 | 1.50    | too fast to measure | |
| 23 | .054 | 64.0 | #7   | .150 g  | 33.0 | 32.0 | ≈2.50   | 4.03  | 148.4 |
| 24 | .054 | 64.3 | #8   | .062 g  | 34.0 | 32.0 | 1.50    | too fast to measure | |
| 25 | .054 | 64.0 | #8   | .290 g  | 35.0 | 32.0 | 2.75    | —     | —     |
| 26 | .054 | 64.0 | #9   | .150 ml | 35.6 | 32.0 | 1.23    | too fast to measure | |
| 27 | .054 | 64.0 | #10  | .150 ml | 33.9 | 32.0 | 1.88    | too fast to measure | |
| 28 | .054 | 64.0 | #11  | .150 ml | 33.6 | 32.0 | 1.32    | too fast to measure | |
| 29 | .049 | 64.0 | #2   | .020 g  | 39.2 | 33.6 | 9.00    | 15.00 | 44.2  |
| 30 | .049 | 64.0 | #2   | .054 g  | 37.5 | 32.0 | 12.00   | 21.00 | 48.00 |
| 31 | .049 | 64.0 | #1   | .032 g  | 39.3 | 32.0 | >16.00  | 14.00 | 14.00 |
| 32 | .049 | 64.0 | none | none    | 40.6 | 34.0 | >60.0   | —     | —     |
| 33 | .051 | 64.0 | #2   | .052 g  | 38.3 | 32.0 | 13.00   | 20.75 | 111.7 |

Gel Modification Additives
•#1 Tricyclopentylphosphine
•#2 Tricyclohexylphosphine
•#3 Triphenylphosphite
•#4 Pyridine
•#5 Propylamine
•#6 Tributylphosphine
•#7 Benzonitrile
•#8 Triphenylarsine
•#9 Anhydrous Acetonitrile
•#10 Thiophene
•#11 Furan6

What is claimed is:

1. A method for making poly-DCPD comprising:
contacting a low grade DCPD starting material that contains between about 81% and about 86% by weight of a DCPD monomer with a catalyst of the formula

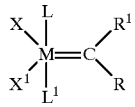

wherein

M is selected is osmium or ruthenium;

R and $R^1$ are independently selected from the group consisting of hydrogen, unsubstituted substituent group and a substituted substituent group wherein the substituent group is selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl;

X and $X^1$ are independently selected from any anionic ligand; and

L and $L^1$ are independently selected from any neutral electron donor.

2. The method as in claim 1 wherein the substituent group is substituted with a moiety selected from the group consisting of $C_1$–$C_5$ alkyl, halide, $C_1$–$C_5$ alkoxy, and phenyl, or a functional group selected from the group consisting of hydroxyl, thiol, ketone, aldehyde, ester, ether, amine, imine, amide, nitro, carboxylic acid, disulfide, carbonate, isocyanate, carbodiimide, carboalkoxy, and halogen.

3. The method as in claim 1 wherein R and $R^1$ are independently selected from the group consisting of hydrogen, substituted aryl, unsubstituted aryl, substituted vinyl, and unsubstituted vinyl; and
wherein the substituted aryl and substituted vinyl are each substituted with one or more groups selected from the group consisting of hydroxyl, thiol, ketone, aldehyde, ester, ether, amine, imine, amide, nitro, carboxylic acid, disulfide, carbonate, isocyanate, carbodiimide, carboalkoxy, halogen, $C_1$–$C_5$ alkyl, $C_1$–$C_5$ alkoxy, unsubstituted phenyl, and phenyl substituted with a halide, $C_1$–$C_5$ alkyl or $C_1$–$C_5$ alkoxy.

4. The method as in claim 1 wherein L and $L^1$ are independently selected from the group consisting of phosphines, sulfonated phosphines, phosphites, phosphinites, phosphonites, arsines, stibines, ethers, amines, amides, sulfoxides, carboxyls, nitrosyls, pyridines, and thioethers.

5. The method as in claim 4 wherein L and $L^1$ are both —P(phenyl)$_3$.

6. The method as in claim 4 wherein L and $L^1$ are phosphines independently selected from PR$^3$R$^4$R$^5$ wherein $R^3$ is selected from the group consisting of secondary alkyl and cycloalkyl and wherein $R^4$ and $R^5$ are independently selected from the group consisting of aryl, $C_1$–$C_{10}$ primary alkyl, secondary alkyl, and cycloalkyl.

7. The method as in claim 6 wherein L and $L^1$ are independently selected from the group consisting of —P(cyclohexyl)$_3$, —P(cyclopentyl)$_3$, and —P(isopropyl)$_3$.

8. The method as in claim 7 wherein L and $L^1$ are the same.

9. The method as in claim 1 wherein X and $X^1$ are independently selected from the group consisting of halogen, hydrogen, $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl.

10. The method as in claim 9 wherein X and $X^1$ are independently selected from Cl, Br, I, H, benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate.

11. The method as in claim 10 wherein X and $X^1$ are independently selected from the group consisting of Cl, CF$_3$CO$_2$, CH$_3$CO$_2$, CFH$_2$CO$_2$, (CH$_3$)$_3$CO, (CF$_3$)$_2$(CH$_3$)CO, (CF$_3$)(CH$_3$)$_2$CO, PhO, MeO, EtO, tosylate, mesylate, and trifluoromethanesulfonate.

12. The method as in claim 11 wherein X and $X^1$ are both Cl.

13. A method for making poly-DCPD comprising:
contacting a low grade RCPD starting material that contains between about 81% and about 86% by weight of a DCPD monomer with a catalyst of the formula

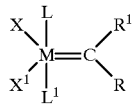

wherein

M is ruthenium;

$R^1$ is hydrogen;

R is substituted aryl, unsubstituted aryl, substituted vinyl, or unsubstituted vinyl;

X and $X^1$ are both chloride; and

L and $L^1$ are triphenylphosphines or tricycloalkylphosphines.

14. The method as in claim 13 wherein the substituted aryl is substituted with one or more groups selected from the group consisting of $C_1$–$C_5$ alkyl, halide, $C_1$–$C_5$ alkoxy, unsubstituted phenyl, and phenyl substituted with a halide, $C_1$–$C_5$ alkyl or $C_1$–$C_5$ alkoxy.

15. The method as in claim 13 wherein the substituted vinyl is substituted with one or more groups selected from the group consisting of $C_1$–$C_5$ alkyl, halide, $C_1$–$C_5$ alkoxy, unsubstituted phenyl, and phenyl substituted with a halide, $C_1$–$C_5$ alkyl or $C_1$–$C_5$ alkoxy.

16. The method as in claim 13 wherein the substituted aryl is substituted with one or more functional groups selected from the group consisting of hydroxyl, thiol, ketone, aldehyde, ester, ether, amine, imine, amide, nitro, carboxylic acid, disulfide, carbonate, isocyanate, carbodiimide, carboalkoxy, and halogen.

17. The method as in claim 13 wherein the substituted vinyl is substituted with one or more functional groups selected from the group consisting of hydroxyl, thiol, ketone, aldehyde, ester, ether, amine, imine, amide, nitro, carboxylic acid, disulfide, carbonate, isocyanate, carbodiimide, carboalkoxy, and halogen.

18. The method as in claim 13 wherein the catalyst is selected from the group consisting of

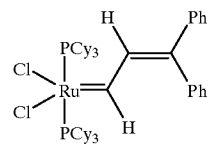

-continued
and

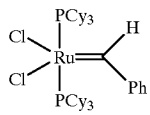

wherein Ph is phenyl and Cy is cyclohexyl or cyclopentyl.

19. The method as in claim 13 wherein the catalyst is selected from the group consisting of

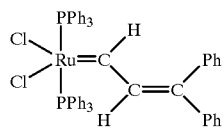

and

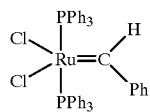

20. A method for making poly-DCPD comprising:

contacting a low grade DCPD starting material that contains between about 81% and about 86% by weight of a DCPD monomer with a catalyst of the formula

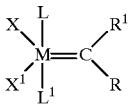

wherein
M is ruthenium;
$R^1$ is hydrogen;
R is substituted phenyl, unsubstituted phenyl, substituted vinyl, or unsubstituted vinyl;
X and $X^1$ are both chloride; and
L and $L^1$ are triphenylphosphines or tricycloalkylphosphines.

21. The method as in claim 20 wherein L and $L^1$ are independently selected from the group consisting of —P(cyclohexyl)$_3$, —P(cyclopentyl)$_3$, and —P(phenyl)$_3$.

22. The method as in claim 21 wherein L and $L^1$ are the same.

23. The method as in claim 20 wherein the DCPD starting material includes a cross-linking agent.

24. The method as in claim 23 wherein the cross-linking agent comprises a peroxide selected from the group consisting of t-butyl peroxide, 2,5-dimethyl-2,5-di-(tert-butylperoxy) hexyne-3, di-tert-butyl peroxide, and 2,5-dimethyl-2,5-di-(tert-butylperoxy) hexane or mixtures thereof.

25. The method as in claim 24 wherein the amount of cross-linking agent is between about 0.01 v % and about 10 v % of the mixture of catalyst, cross-linking agent and DCPD starting material.

* * * * *